United States Patent
Spengler et al.

(10) Patent No.: US 8,874,598 B2
(45) Date of Patent: Oct. 28, 2014

(54) METHOD AND SYSTEM FOR AN EXECUTABLE SPECIFICATION

(75) Inventors: Michael Spengler, Forst (DE); Rene Laengert, Massenbachhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/188,138

(22) Filed: Jul. 21, 2011

(65) Prior Publication Data

US 2013/0024478 A1    Jan. 24, 2013

(51) Int. Cl.
- *G06F 17/30* (2006.01)
- *G06F 9/44* (2006.01)
- *G06F 11/36* (2006.01)

(52) U.S. Cl.
CPC .................................. *G06F 11/3692* (2013.01)
USPC ................... 707/758; 707/736; 707/E17.124; 717/124

(58) Field of Classification Search
CPC ......... G06F 8/71; G06F 17/2211; G06F 8/43; G06F 11/368; G06F 11/3604; G06F 9/44589; G06F 11/3668; G06F 8/60
USPC .......... 707/758; 714/38.1–38.4; 717/100–167
See application file for complete search history.

(56) References Cited

U.S. PATENT DOCUMENTS

| | | | |
|---|---|---|---|
| 6,301,701 B1 * | 10/2001 | Walker et al. | 717/125 |
| 7,054,881 B2 * | 5/2006 | Arcand et al. | 707/687 |
| 7,620,939 B2 * | 11/2009 | Jakubiak | 717/124 |
| 7,711,992 B2 * | 5/2010 | Coulter et al. | 714/38.11 |
| 8,122,111 B2 * | 2/2012 | Shekar et al. | 709/221 |
| 8,656,349 B2 * | 2/2014 | Lochmann | 717/107 |
| 2005/0114851 A1 * | 5/2005 | Watson-Luke et al. | 717/168 |
| 2010/0257513 A1 * | 10/2010 | Thirumalai et al. | 717/134 |
| 2011/0191575 A1 * | 8/2011 | Sugiyama | 713/2 |

OTHER PUBLICATIONS

Nicolas Bruno and Rimma V. Nehme, "Finding Min-Repros in Database Software", In Proceedings of the Second International Workshop on Testing Database Systems, DBTest '09, Jun. 29, 2009, Providence, Rhode Island, USA, AMC 978-1-60558-706-6, 6pgs.

* cited by examiner

*Primary Examiner* — Michelle Owyang
(74) *Attorney, Agent, or Firm* — Buckley, Maschofff & Talwalkar LLC

(57) ABSTRACT

According to some embodiments, a method and system provides executing, by a processor, a software module under test to obtain a first reference set of data; executing, by the processor, the software module under test to obtain a second reference set data; transforming, by the processor, the first reference set of data and the second reference set of data into a first formal text form representation and a second formal text form representation, respectively; determining a plurality of differences between the first set of reference data and the second set of reference data by comparing the first formal text form representation and the second formal text form representation; filtering the plurality of differences to obtain a sub-set of the plurality of differences based on at least one filter criteria; and generating a report of the sub-set of plurality of differences.

17 Claims, 7 Drawing Sheets

METHOD AND SYSTEM FOR AN EXECUTABLE SPECIFICATION

FIELD

Some embodiments generally relate to software testing. More specifically, some embodiments provide a method and system for determining an executable specification for a software product and verifying the software product.

BACKGROUND

In the software industry there may be a need to review the functionality of a software application, program, module, or product. The need to review the functionality the software may be prompted by a desire to determine whether the software satisfies its design requirements and functions as expected. In some instances, there might be a need to determine what the software application, program, module or product does. For example, an existing legacy software product may be in use by a business and there might not be a complete understanding of what the software product does. In some instances, a software provider may want to or have to modify a software product (e.g., a client requests new features, a legal obligation requires a software modification, etc.). Furthermore, the changes or upgrades may be desired without having to sacrifice existing functionality. However, the exact extent of the existing functionality of the software product may not be fully understood.

An understanding of what the software product does, (i.e., the functionality of the software product), might be gained by a testing of the software product, including an examination of the data produced by an execution of the software product. Software testing may generally include four phases. The phases being (1) a setup phase to prepare the testing environment or context (i.e., the fixture), (2) an execute system under test phase wherein the software is run under prescribed test conditions, (3) a verification phase where a functionality, stability, and other aspects of the software relative to an expected result is validated, and (4) a teardown phase where the fixture is tore down and the software may be returned to normal operating configuration. Data produced by an execution of a software product may typically produce hundred or even thousands fields of data. Checking or verifying that each and every field may thus be an arduous task. In some instances, only a relatively small number of result data fields may be examined. As an example only data fields considered the most important may be verified, about 5% of the data in some instances. While a problem in the software product may manifest itself as an error in a data field resulting from the execution of the software product, such a "bug" may not be readily detected when less than all of the fields are checked.

Accordingly, a method and mechanism for efficiently verifying a software product, application, module, or program may be provided by some embodiments herein.

DETAILED DESCRIPTION

Aspects of embodiments herein may relate to software testing. More particularly, some embodiments relate to and provide mechanisms of software testing verification. As used herein, software may refer to an application, program, module, product, procedures, or sets thereof that provide instructions for a computer or processor. As used herein, the terms software, software application, software program, software module, software product, or software procedures may be used interchangeably, unless specifically noted otherwise.

In some contexts, for example an instance where an existing legacy software module is to be updated without (hopefully) losing existing functionality, it may be desirable to obtain a specification of the software module before making the update changes so that a verification may be made after the software module has been upgraded to ensure that the software module retains the desired functionality. As used herein, a software specification provides a description of the functionality of the software. In some aspects, it is further desired to have a reliable and robust verification process. Accordingly, some embodiments herein provide for verifying all of the data fields of the software specification, including all of the data fields resulting from an execution of a software module.

Figure 1:
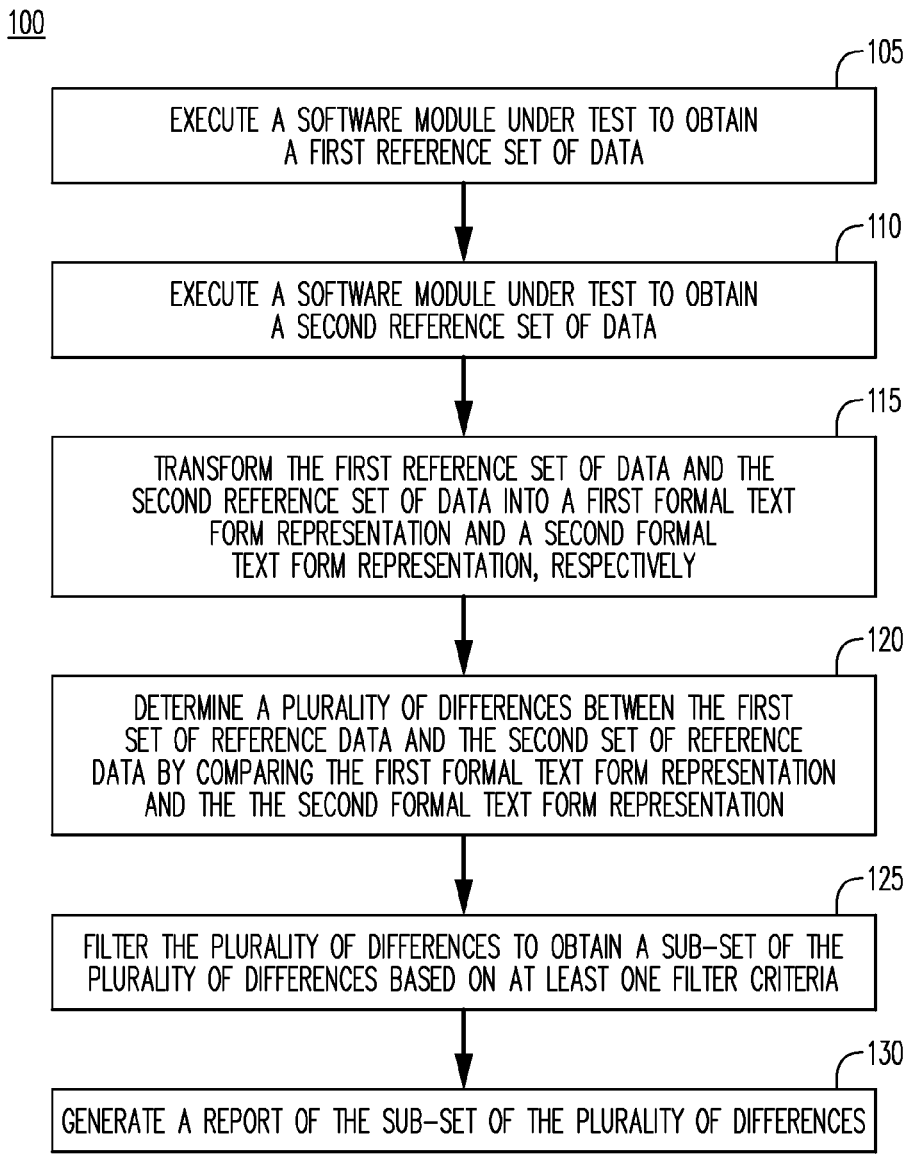
FIG. 1 is a flow diagram according to some embodiments.

FIG. 1 is an illustration of a process 100 in accordance with some embodiments herein. At operation 105, a software module is executed under test. Aspects of software testing, such as the setup of the testing environment (not shown) may have been established separately and prior to process 100. The data produced by executing the software module at 105 may be referred to as a first reference set of data or expected data. The first reference set of data may include data resulting from execution of each instruction, routine, or other executable part or sub-part of the software module. The data produced by the execution of the software is obtained and persisted for future reference. The data may be persisted in any type of data storage facility, including for example a local memory, a cloud-based storage, a database, and other data stores. The data from operation 105 may be persisted or saved for future use, where the future use may include being analyzed or further processed. The first set of reference data may be stored in the format in which is produced by the software module.

Operation 105 may facilitate the generation of a specification for the software module. As used herein, a software specification provides a description of the functionality of a software product. In the example of an existing legacy software module, though not limited to such as example, data obtained by executing the software module under test while adhering to prescribed test conditions may constitute a specification of the software module. The data from the execution of the software module, including all of the data produced thereby, may provide a complete and accurate description of what the software module accomplishes.

At operation 110, the software module is executed under test to obtain a second reference set of data. It is noted that a change may have been introduced to the software module executed under test at 110. In some instances, the change may include a software upgrade or other change(s). The software change(s) may be motivated by a customer's request for a new or enhanced feature, an introduction of a new or evolving feature, a requirement as imposed by a governing body's rules, and other considerations. In some instances, a change may not have been deliberately introduced prior to the execution of the software module under test at 110. In some instances, it may be anticipated or suspected that a change may have somehow been introduced into the software module at some point in time after 105. Such a suspicion may thus prompt the execution of the software module at 110 as part of an effort to determine whether the software module is performing as expected. This data may be persisted and stored in any suitable data storage facility as a second reference set of data or actual data. The second set of reference data may be stored in the format in which it is produced. In some embodiments, the first set of reference data and the second set of reference data may be any database table data or other structured data.

At operation 115, the first reference set of data and the second reference set of data may each be transformed into a formal text form representation. As used herein, a formal text representation is a textual representation that complies with an established set of rules including, for example, the formatting and syntax of the text representation. In some embodiments, the formal text representation may be Extensible Markup Language (XML), other XML-based languages, or other languages. The transformed first reference set of data and the transformed second reference set of data may thus be referred to as a first formal text representation and a second formal text representation, respectively. The data may be transformed into the formal text representations to facilitate further processing by software applications or services that accept and operate on formal text representations (e.g., XML). In some embodiments, the first formal text representation and the second formal text representation may be a database table or other structured data.

Operation 120 provides a mechanism to determine differences between the data results of the first execution of the software module at operation 105 and the data results of the second execution of the software module at operation 110 by comparing the first formal text representation and the second formal text representation. A comparison of the first formal text representation and the second formal text representations may utilize automated processes designed to operate on formal text. Given that the first reference set of data is transformed to the first formal text representation and the second reference set of data is transformed to the second formal text representation, comparison logic to determine the differences at operation 120 may be detached from and independent of the data format of the first and second reference sets of data.

In some embodiments, the number of differences determined at operation 120 may be large. This may be particularly true in part since, in some embodiments, all of the data fields resulting from an execution of the software module are obtained and persisted at operations 105 and 110, transformed at operation 115, and compared at 120. Additionally, changes due to differences in input data may necessarily generate some differences. For example, unique identifiers, dates, and other types of data fields may generate differences, as determined at 120. These and some other types of differences may not be unexpected.

Continuing to operation 125, the plurality of differences may be filtered to obtain a sub-set of differences. The plurality of differences may be filtered based on one or more filter criteria. The filter criteria may include selections that address differences based on, for example, unique item identifiers, dates, and fields for which a determination is made that a specific difference or type of difference is either expected or not relevant for purposes of a subject analysis and/or verification investigation of process 100. In some aspects, expected differences between the expected data of the first formal text representation and the second formal text representation may be filtered out or excluded from the sub-set of the plurality of differences obtained at operation 125. Filter criteria and customer-specific checks of specific data fields or types of data may be performed to remove differences not considered significant or relevant. Such filters and customer-specific checks may include, for example, constraints that "a field must be a date", a directive not compare a particular field or type of field, a check that a field is (or is not) absent a value (i.e., null). Accordingly, operation 125 may include an ability or mechanism to configure some comparison parameters to handle, for example, date, unique identifiers, and other examples of data fields or types of data fields that may vary in an expected manner but are not the type of changes or differences considered relevant for a subject process 100. That is, a mechanism to customize the comparison or results of the comparison of operation 125 may be provided so that the comparison or comparison results do not include each and every type of difference.

In some embodiments, filtering aspects of 125 may be considered with or before operation 120 such that the comparison(s) of operation yield a set of "pre-filtered" differences. In some embodiments, a further filter operation may be performed at operation 125 as illustrated to include, for example, customer or other specific filters to the plurality of differences.

Operation 130 includes a report generation of the sub-set of the plurality of the differences. This report of the result set of differences may be reported by saving the obtained sub-set of the differences in a log file or record, displaying the differences to a user and transmitting a report to a user or device.

In some embodiments a log of the sub-set of the differences may be reviewed by a user, either manually, automatically, or a combination thereof. The review may comprise the user providing an indication that a particular difference or type of difference is not significant for reporting purposes. In this manner, but not limited thereto, a user may make a customized filter for a particular process 100. In some aspects, such a customized filter may be saved for re-use in the future.

Some embodiments may include automating some or all of the operations of process 100 as part of, for example, a test automation process or a stand-alone process. In particular, operations 110-130 may be automated such that at least parts of subsequent executions of the software module, the data transformations, the data comparison, the filtering, and the reporting aspects of process 100 are automated. It is noted that all of the data produced by a software module of process 100 may be compared therein since all of the data from the execution of the software module are obtained and persisted, including the first reference set of data.

In some embodiments, a process or method herein may include a capability to map a difference obtained from comparing the first and second formal text representations to the data responsible for the difference. In this manner, it may be possible to determine at which point in the execution of the software module the difference occurred. As stated above, all of the data produced by the execution of the software module is obtained and persisted. Accordingly, the portion of the software module responsible for generating the difference may be determined by examining the data fields, all of which are available in some embodiments here.

In some instances, the cause of a difference may be reported, either in a log, another type of report, or via a user interface presentation for viewing by a user. For example, a difference may be presented in a display pane of a user interface. Moreover, a presentation of an indication of the portion of the software module responsible for the reported difference may also be presented in the user interface. In some aspects, the user interface may provide a display of the differences and the root cause(s) of those differences in a graphical user interface display pane, wherein the user may be presented with an indication of the portion of the software module responsible for the difference by interacting with the differences presented in the user interface. For example, a user may move a cursor over a presentation of a particular difference, select the displayed difference via a "point and click" procedure, and be presented with a display of the particular portion of the software module mapped to that particular difference. In some aspects, the user interface presentation may be color-coded or otherwise visually enhanced to emphasize certain differences, the selection of differences, and the mapped location or portion of the software module responsible for the differences.

In some aspects, process 100 may provide improved and faster error analysis. As 100 may verify the values of all data fields provided by an execution of the software module. Given all data fields are persisted for comparison and analysis, process may facilitate faster error analysis, including the detection of a "bug" in the software. In this manner, process 100 may prove more efficient as compare to previous methods for providing a software specification and software verification.

In some embodiments, process 100 may be used to verify the functionality of a software module or product is retained after the introduction of, for example, a software upgrade including features that introduce new functionality. Referring again to FIG. 1, the upgrade may be added to the software module prior to an execution of the software module a second time at operation 110 to obtain the second reference set of data or actual data. It is noted that all of the data produced by the execution of the software module at operation 110, including data related to the upgraded portion of the software module, is obtained in accordance with some embodiments. The transformation 115, comparison 120, and filtering 125 operations of process 100 may be performed to determine whether the desired functionality of the software module has been retained after the software upgrade. Moreover, all of the data recorded based on the execution of the software module at operation 110, including data related to the upgraded portion of the software module, produces the second reference set of data or actual data that is used to verify the functionality of the software product. Upon verifying the desired functionality is continued in the upgraded version of the software product, the second set of reference data may constitute a specification for the upgraded version of the software and the previous first reference set of data may be replaced with the newly acquired second set of reference or actual data. Accordingly, a new first reference set of data, that is expected data, may be established for use in future software verifications of the upgrade version of the software product. The first reference set of data, a specification, which will be used to verify subsequent data sets (e.g., a new second reference set of data) need only be obtained and persisted once.

In some embodiments, a new specification may be created to account for variances in the functionality of a software product. For example, a first specification may be created for a first variant of a software module provided to a first customer, a second specification may be created for a second variant of the software product that is provided to a same or different customer, and a third specification may be created for a third variant of the software product that is provided to a same or different customer.

It is noted that methods and processes herein, including process 100, may be generally applicable to any executable software as long as the executable software produces some data output or some indirect output on a database. Furthermore, the processes and methods herein are applicable to structured data having identifiable data fields that may be serialized for, as an example, comparison of data values. In some embodiments, the data produced may be related to business processes that are represented as business objects (BOs) of an object-oriented data model. The BO data may be persisted in a database.

Figure 2:
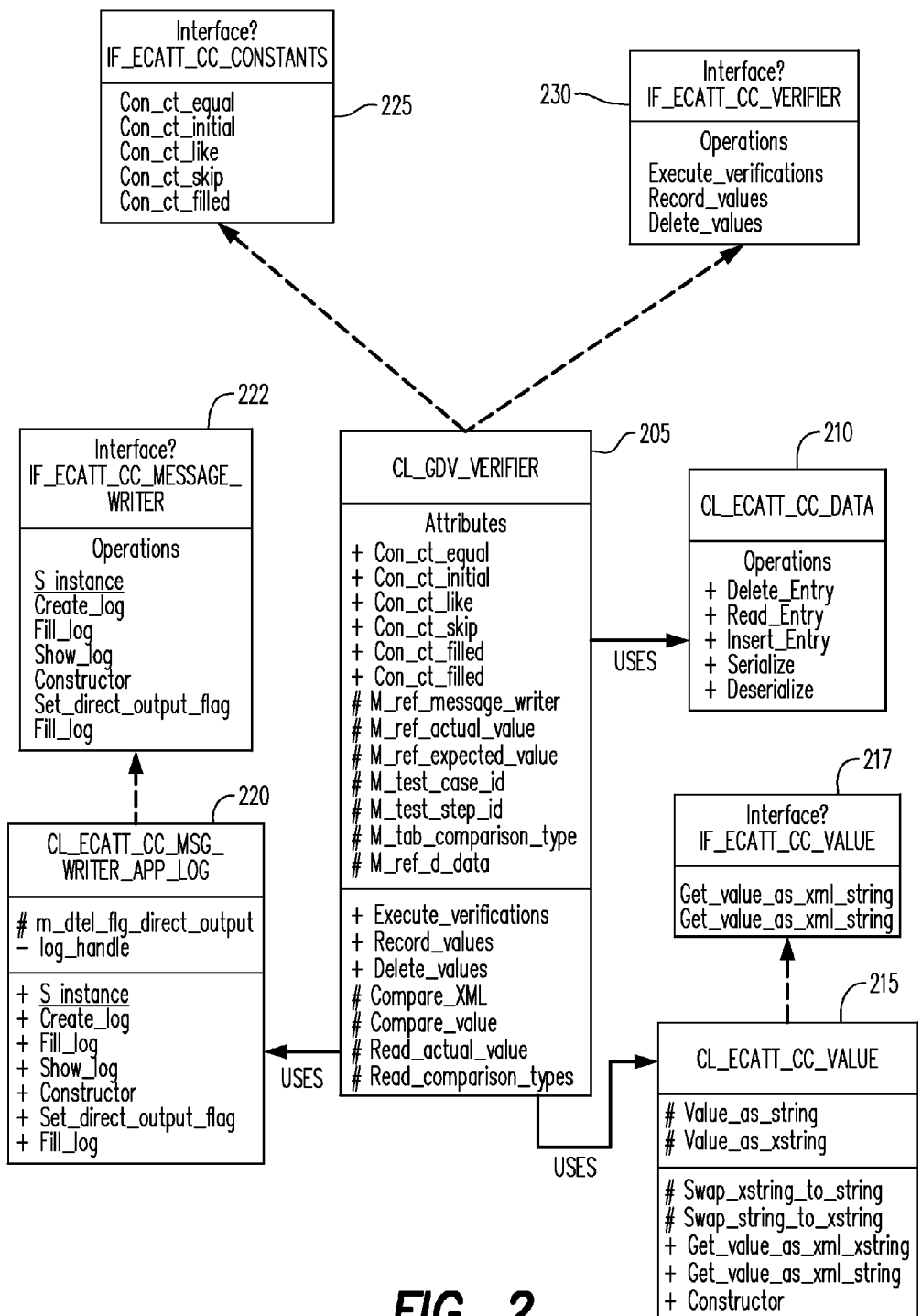
FIG. 2 is a depiction of some implementation aspects in accordance with some embodiments.

In some embodiments, an object-oriented modeled service may use business objects to implement the methods and processes disclosed herein. By way of example, FIG. 2 provides a logical illustration 200 of a central BO class "CL_GDV_VERIFIER" 205 that may be defined and used to achieve the data verification process(es) herein. BO 205 corresponds to and encapsulates the business logic related to the verifier process in some embodiments, including the data required by the logic. BO 205 includes attributes that describe the data associated with the BO and operations that make use of the data referred to by the attributes to carry out the functions of the BO. It is noted that BO 205 includes, for example, attributes such as a message writer, an actual value, and an expected value. All of these and other types of data are used by the verification process in some embodiments, as discussed in regards to process 100 for example. As also shown in BO 205, the operations of the BO includes methods to execute a verification, record values, delete values, compare XML, compare values, read an actual value, and read comparison types—all methods using the attributes of the BO to implement a software verification process in some embodiments. BO classes 210, 215 and 220 and interfaces 217, 222, 225, and 230 are also shown in FIG. 2 to illustrate some of the relationships that BO 205 may have with other BO classes. While BO 205 is associated with a number of other BOs, it uses BO classes 210, 215, and 220 as helper classes. Instances of BO classes 210, 215, and 220 are attributes of BO class 205. Class 210 handles data operations such as reading, writing, inserting, deleting, and serializing data into a database table. Class 215 handles the data stored in the database and may store fetched data in XML string and XML xstring formats (e.g., transform software execution result data into XML-based formatted formal test representations). Class 220 may be a message writer that uses a log writer application to create and populate a log with data.

Figure 3:
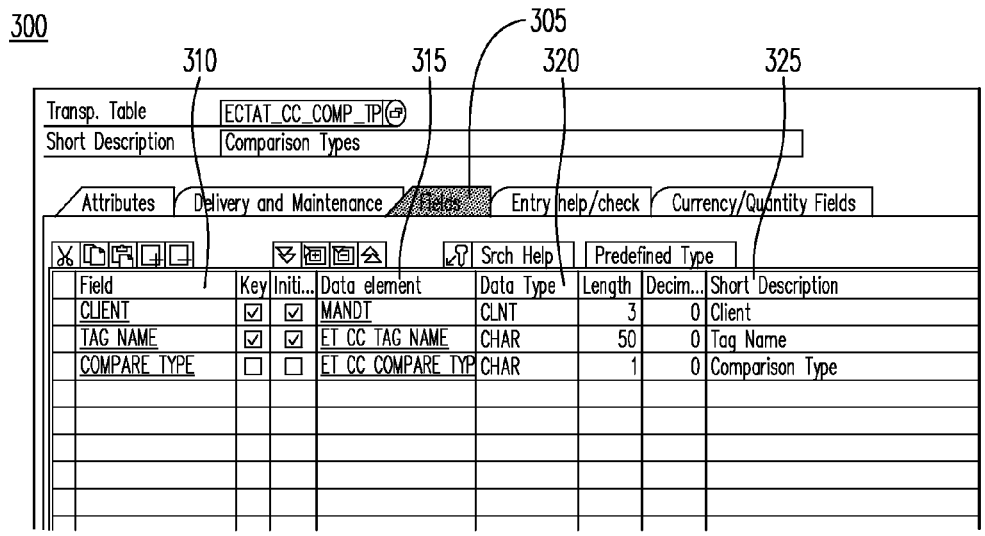
FIG. 3 is an illustration of a user interface in accordance with some embodiments.

FIG. 3 illustrates a user interface including a depiction of a database table 300 of some of the various types of comparisons in some embodiments herein. The types of comparisons specified in database table 300 may be used to compare an actual result (e.g., a subsequent or second software execution result data) and an expected result (e.g., a first software execution result data). Regarding database table 300, the fields 305 are displayed in FIG. 3. As further illustrated, each specific data field 310 may be associated be a specific data element 315, and consist of a particular data type 320. In some aspects, a short description of the data field may be provided to facilitate a user's comprehension of what each data field relates to.

Figure 4:
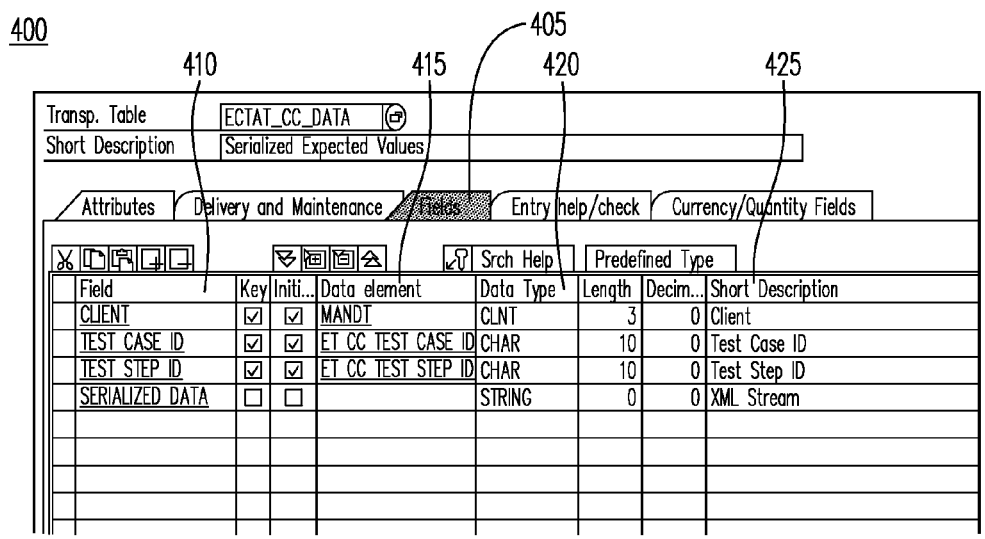
FIG. 4 is an illustration of a user interface in accordance with some embodiments.

FIG. 4 is an example depiction of a user interface including a depiction of a database table for storing the data results of a software execution in some embodiments. The fields tab 405 is selected in the depicted table and the fields of data are displayed. Aspects such as the particular fields 410 and their associated data element 415, data type 420, and a short description of the data field are also shown in FIG. 4. It should be appreciated that other aspects of the stored expected data values of a software product execution may be stored in the table, as suggested by the other tabs shown in FIG. 4.

Figure 5:
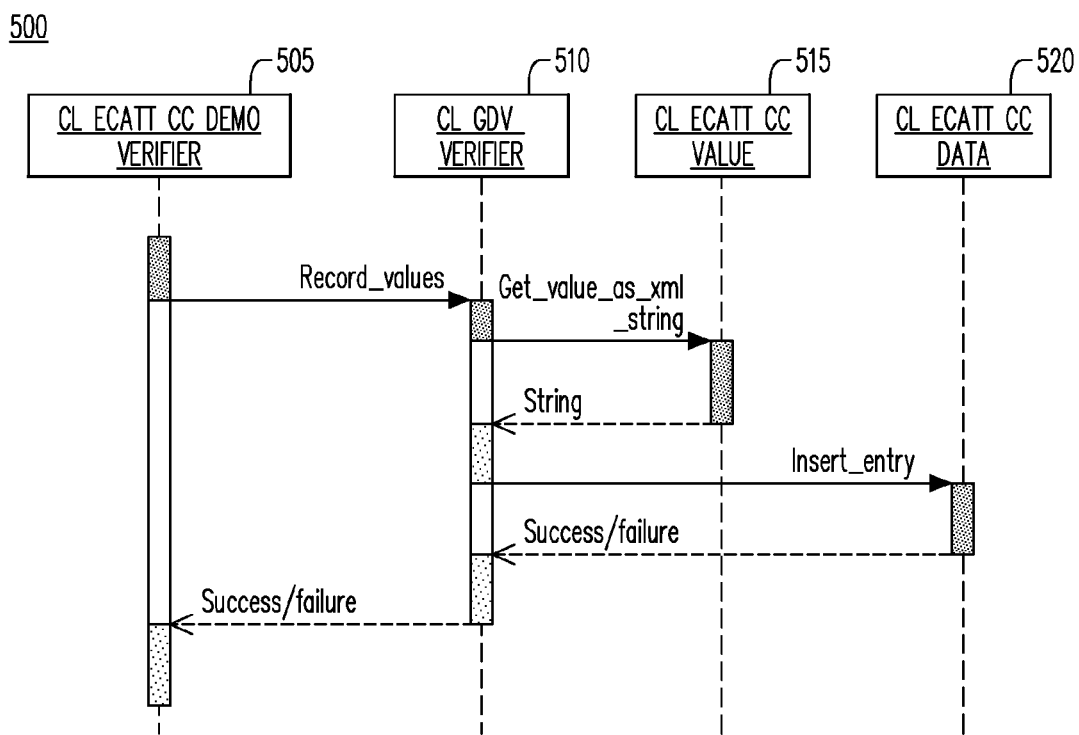
FIG. 5 illustrates a sequence diagram according to some embodiments.

FIG. 5 is an illustration of a sequence diagram 500, depicting a sequence of operations that may be used to implement aspects of the processes herein. Sequence diagram 500 may be used to record software execution result data in a database table, including for example a first set of reference data that may be used in a verification process as the expected data in a comparison. As shown, a number of BOs 505, 510, 515, and 520 may be used to perform the tasks associated with performing the process of storing the data. In the example of FIG. 5, the BOs used may be the same as the BOs introduced in FIG. 4. In some contexts the BOs may differ from those specifically illustrated in the example of FIG. 4.

Referring to the sequence of operations depicted in sequence diagram 500, a request to record data values may be sent from a generic verifier BO 505 to a specifically defined instance of a verifier, BO 510. BO 510 may in turn request the data value as an XML string, where BO 515 returns the serialized formal text representation of the data, the XML string, to BO 510. The verifier BO 510 may then proceed to insert the XML string into a database using BO 520. BO 520 may provide an indication of whether it succeeded in recording the XML string in the database to BO 510. BO 510 may in turn report the success or failure of the recording of the XML in the database to BO 505 to complete the process.

Figure 6:
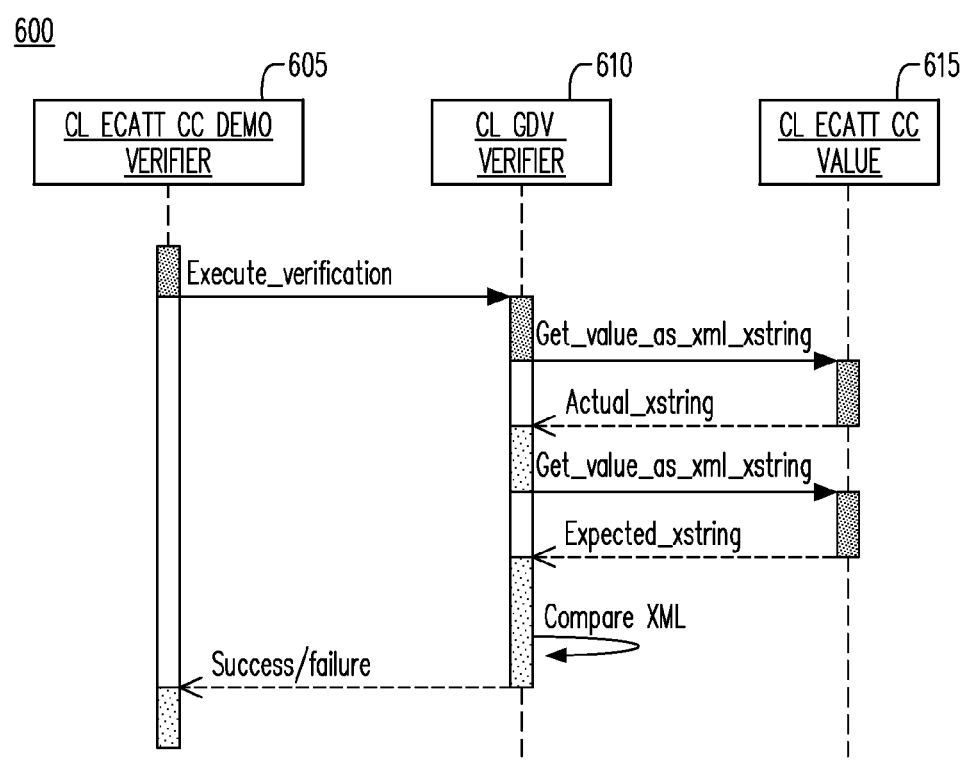
FIG. 6 illustrates another sequence diagram according to some embodiments.

FIG. 6 is an illustrative depiction of a sequence diagram 600. Sequence diagram 600 shows a sequence of operations that may be used to implement aspects of the processes herein. Sequence diagram 600 may be used to compare software execution result data, including actual result data and expected result data. The actual result data may be provided as an input parameter and the expected result data may be retrieved from a database given it was stored earlier. As shown, a number of BOs 605, 610, and 615 may be used to perform the tasks associated with performing the process of comparing the data. In the example of FIG. 6, the BOs used may be the same as the BOs introduced in FIG. 4, although this may not necessarily be the case for some embodiments.

Turning to the sequence of operations depicted in sequence diagram 600, the verification process may be initiated by a request to compare data values being sent from a generic verifier BO 605 to a specifically defined instance of a verifier, BO 610. BO 610 may in turn request the actual result data values as an XML string from BO 615. BO 615 responds to the request by returning the serialized formal text form representation of the actual data, an XML string, to BO 610. BO 610 may then further request the expected result data value as an XML string from a second instance of BO 615. BO 615 responds to the request by returning the serialized formal text form representation of the expected data as an XML string to BO 610. Now having both the actual result data result and the expected result data, verifier BO 610 may proceed to compare the vales to verify whether there are any differences between the two sets of data. BO 610 includes the detailed comparison logic, as depicted in FIG. 4, to provide the comparison operation. BO 610 may further provide an indication of whether it succeeded in comparing the XML data values to BO 610.

Figure 7:
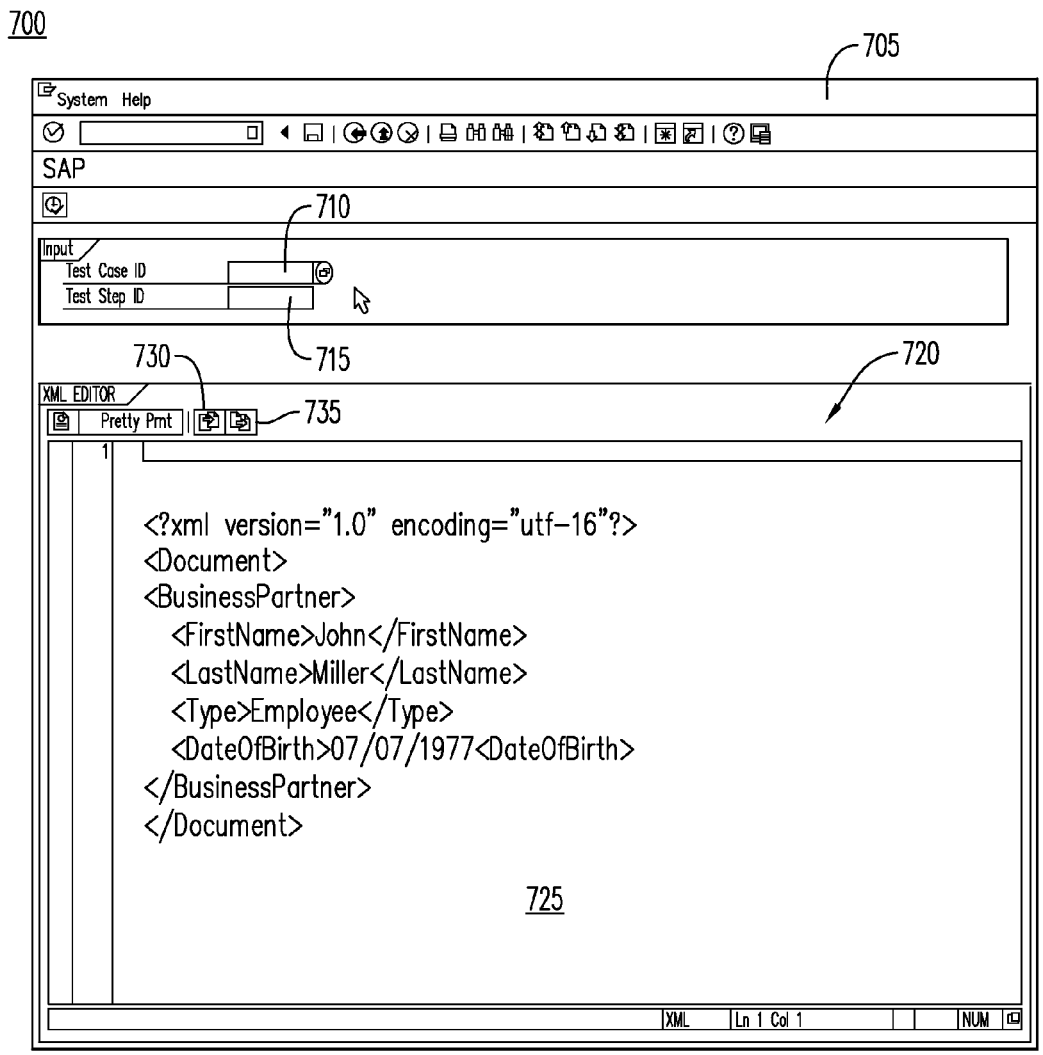
FIG. 7 is a depiction of a data entry screen shot according to some embodiments.

In some contexts, a user may want to make changes to the data recorded as expected data in a process herein without having to necessarily re-run the software product under test conditions to record the new expected data values. For example, it may be the case that running the software product with a given set of data will produce data results having certain known values that will be different than the expected results earlier stored for the software product. Such an example may include data related to a new business entity client having a different name and address attributes. Some embodiments may provide, via a user interface, a capability to edit the values of stored expected data values. FIG. 7 is an illustrative depiction of a user interface screen 700 that may be provided for editing data values stored in a database as XML-based data strings (i.e., a formal text representation). User interface 700 may be implemented using a user interface framework to include a number of user interface components consistent with a software provider's design goals, including some common layout configurations and functionality. User interface 700 may include a tool bar 705, including icon buttons for such features as opening, closing, saving, printing, and other features. More specific to some embodiments herein, user interface 700 may include an input section that provides an entry form for a test case id and a test step id. A user may specify a particular data result to edit by providing the test case id at 710 and the test step id 715 corresponding to an earlier recorded software execution under test and the specific portion of that software execution. The requested data identified by the test case id and the test step id may be provided in XML editor 720 in display pane 725. A load button 730 may be selected to load a desired XML record into editor 720 for editing by the user. As an example, display pane 725 includes a sample listing of an XML record. Save button 735 may be used to save an edited version of the expected data to the database.

Figure 8:
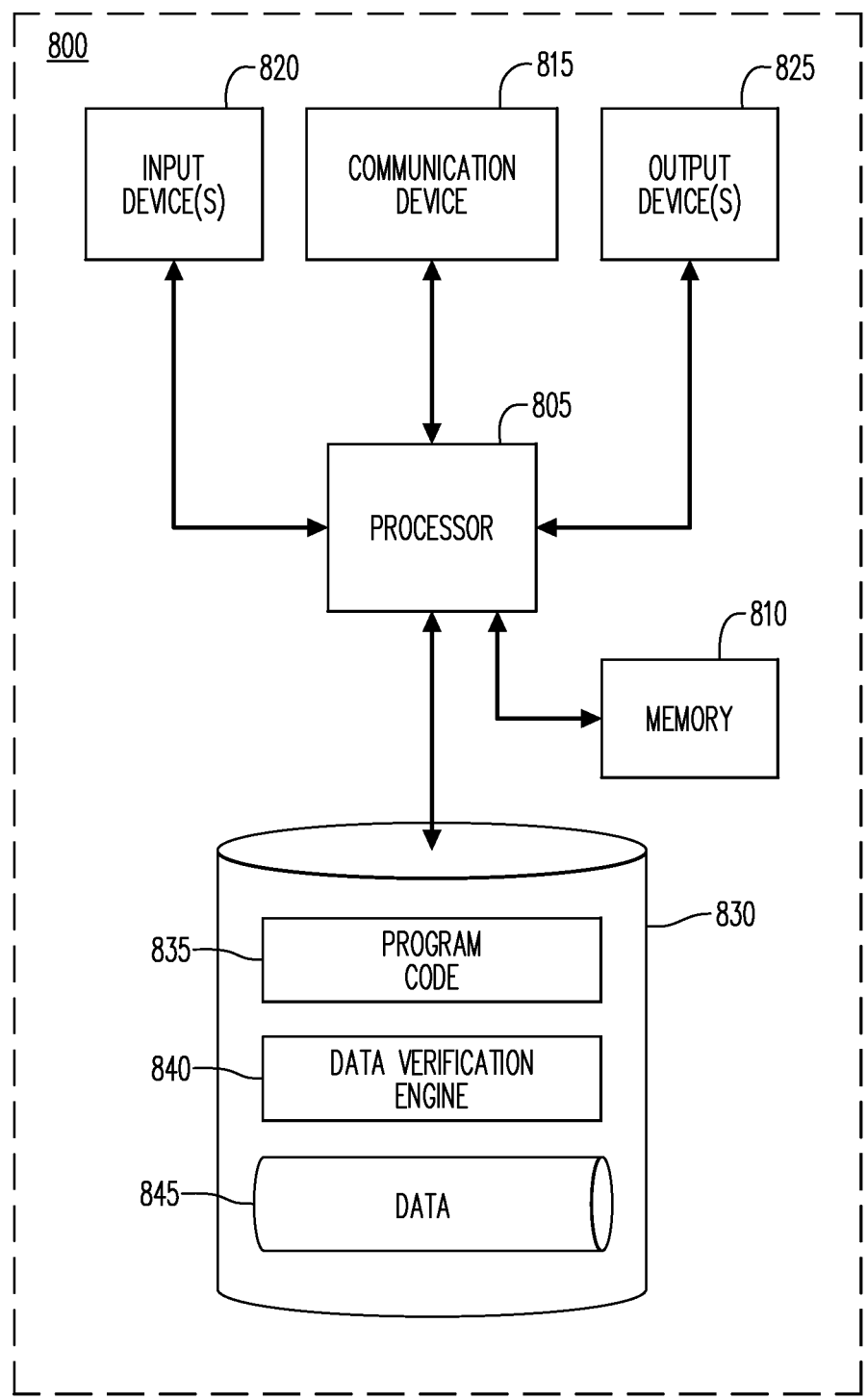
FIG. 8 is a block diagram of a system according to some embodiments.

FIG. 8 is a block diagram overview of a system or apparatus 800 according to some embodiments. System 800 may be, for example, associated with any device to implement the methods and processes described herein, including for example client devices and a server of a business service provider that provisions software products. System 800 comprises a processor 805, such as one or more commercially available Central Processing Units (CPUs) in the form of one-chip microprocessors or a multi-core processor, coupled to a communication device 815 configured to communicate via a communication network (not shown in FIG. 8) to another device or system. In the instance system 800 comprises an application server, communication device 815 may provide a means for system 800 to interface with a client device. System 800 may also include a local memory 810, such as RAM memory modules. The system 800 further includes an input device 820 (e.g., a touch screen, mouse and/or keyboard to enter content) and an output device 825 (e.g., a computer monitor to display a user interface element).

Processor 805 communicates with a storage device 830. Storage device 830 may comprise any appropriate information storage device, including combinations of magnetic storage devices (e.g., a hard disk drive), optical storage devices, and/or semiconductor memory devices. In some embodiments, storage device may comprise a database system.

Storage device 830 stores a program code 835 that may provide computer executable instructions for processing requests from, for example, client devices in accordance with processes herein. Processor 805 may perform the instructions of the program 835 to thereby operate in accordance with any of the embodiments described herein. Program code 835 may be stored in a compressed, uncompiled and/or encrypted format. Program code 835 may furthermore include other program elements, such as an operating system, a database management system, and/or device drivers used by the processor 805 to interface with, for example, peripheral devices. Storage device 830 may also include data 845. Data 845 may be used by system 800, in some aspects, in performing the processes herein, such as process 100.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method for verifying data structures, the method comprising:
   executing, by a processor, a software module to obtain a first reference set of data produced by the software module, wherein the first reference set of data comprising all data produced by the software module at a first time;
   introducing, by the processor, a change to the software module after the first time to generate a modified software module;
   executing, by the processor, the modified software module to obtain a second reference set of data produced by the modified software module, wherein the second reference set of data comprising all data including data related to at least one changed portion of the modified software module produced by the modified software module at a second time, and wherein the executing at the second time is response to the introduced change;
   transforming, by the processor, the first reference set of data produced by the software module and the second reference set of data produced by the modified software module into a first formal text form representation and a second formal text form representation, respectively;
   determining, by the processor, a plurality of differences between the first reference set of data produced by the software module and the second reference set of data produced by the modified software module by comparing the first formal text form representation and the second formal text form representation to each other;
   filtering, by the processor, the plurality of differences to obtain a sub-set of the plurality of differences based on at least one filter criteria;
   mapping, by the processor, each difference in the sub-set of the plurality of differences to a corresponding portion of the modified software module responsible for the difference to determine at which point in execution of the modified software module the difference occurred;
   generating, by the processor, a report of the sub-set of plurality of differences, the corresponding mapped portions of the modified software module, and root cause of the sub-set of plurality of differences;
   wherein the second reference set of data is further used, by the processor, to verify whether a functionality of the modified software module is retained after the introduced change;
   replacing, by the processor, the first reference set of data with the second set of second reference set of data upon verifying that the functionality is retained; and
   establishing, by the processor, the second reference set of data as a new first reference set of data to use in future software module verification.

2. The method of claim 1, further comprising: persisting the first reference set of data produced by the software module and the second reference set of data produced by the modified software module in a storage facility.

3. The method of claim 1, wherein the at least one filter criteria includes known data deviations.

4. The method of claim 1, wherein the at least one filter criteria is at least one of user specific filter criteria and user-role specific filter criteria.

5. The method of claim 1, further comprising presenting the report of the sub-set of the plurality of differences in a graphical user interface.

6. The method of claim 1, wherein the first formal text form representation and the second formal text form representation are encoded as Extensible Markup Language (XML).

7. A system comprising:
   a processor;
   a database; and
   a memory coupled to the processor and the database, the memory storing instructions executable by the processor to:
   execute a software module to obtain a first reference set of data and store in the database, wherein the first reference set of data is produced by the software module, and wherein the first reference set of data comprising all data produced by the software module at a first time;
   introduce a change to the software module after the first time to generate a modified software module;
   execute the modified software module to obtain a second reference set of data and store in the database, wherein the second reference set of data including data related to at least one changed portion of the modified software module is produced by the modified software module at a second time, and wherein the execute at the second time is response to the introduced change;
   transform the first reference set of data produced by the software module and the second reference set of data produced by the modified software module into a first formal text form representation and a second formal text form representation, respectively;
   determine a plurality of differences between the first reference set of data produced by the software module and the second reference set of data produced by the modified software module by comparing the first formal text form representation and the second formal text form representation to each other;
   filter the plurality of differences to obtain a sub-set of the plurality of differences based on at least one filter criteria;
   map each difference in the sub-set of the plurality of differences to a corresponding portion of the modified software module responsible for the difference to determine at which point in execution of the modified software module the difference occurred;
   generate a report of the sub-set of plurality of differences, the corresponding mapped portions of the modified software module, and root cause of the sub-set of plurality of differences;
   wherein the second reference set of data is further used, by the processor, to verify whether a functionality of the modified software module is retained after the introduced change;
   replace the first reference set of data with the second set of second reference set of data upon verifying that the functionality is retained; and
   establish the second reference set of data as a new first reference set of data to use in future software module verification.

8. The system of claim 7, wherein the memory stores instructions executable by the processor to persist the first reference set of data produced by the software module and the second reference set of data produced by the modified software module in a storage facility.

9. The system of claim 7, wherein the at least one filter criteria includes known data deviations.

10. The system of claim 7, wherein the at least one filter criteria is at least one of user specific filter criteria and user-role specific filter criteria.

11. The system of claim 7, wherein the memory stores instructions executable by the processor to present the report of the sub-set of the plurality of differences in a graphical user interface.

12. The system of claim 7, wherein the first formal text form representation and the second formal text form representation are encoded as Extensible Markup Language (XML).

13. A non-transitory medium, the medium comprising:
instructions to execute a software module to obtain a first reference set of data, wherein the first reference set of data is produced by the software module, and wherein the first reference set of data comprising all of data produced by the software module at a first time;
instructions to introduce a change to the software module after the first time to generate a modified software module;
instructions to execute the modified software module to obtain a second reference set of data, wherein the second reference set of data including data related to at least one changed portion of the modified software module is produced by the modified software module at a second time, and wherein the execute at the second time is response to the introduced change;
instructions to transform the first reference set of data produced by the software module and the second reference set of data produced by the modified software module into a first formal text form representation and a second formal text form representation, respectively;
instructions to determine a plurality of differences between the first set of reference set of data produced by the software module and the second set of reference set of data produced by the modified software module by comparing the first formal text form representation and the second formal text form representation to each other;
instructions to filter the plurality of differences to obtain a sub-set of the plurality of differences based on at least one filter criteria;
instructions to map each difference in the sub-set of the plurality of differences to a corresponding portion of the modified software module responsible for the difference to determine at which point in execution of the modified software module the difference occurred;
instructions to generate a report of the sub-set of plurality of differences, the corresponding mapped portions of the modified software module, and root cause of the sub-set of plurality of differences;
wherein the second reference set of data is further used, by the processor, to verify whether a functionality of the modified software module is retained after the introduced change;
replace the first reference set of data with the second set of second reference set of data upon verifying that the functionality is retained; and
establish the second reference set of data as a new first reference set of data to use in future software module verification.

14. The medium of claim 13, further comprising instructions to persist the first reference set of data produced by the software module and the second reference set of data produced by the modified software module in a storage facility.

15. The medium of claim 13, wherein the at least one filter criteria includes known data deviations.

16. The medium of claim 13, wherein the at least one filter criteria is at least one of user specific filter criteria and user-role specific filter criteria.

17. The medium of claim 13, further comprising instructions to present the report of the sub-set of the plurality of differences in a graphical user interface.

* * * * *